United States Patent [19]
Burke et al.

[11] 3,831,076
[45] Aug. 20, 1974

[54] SECTOR SCANNING CONTROL SYSTEM

[75] Inventors: Michael J. Burke; Kenneth E. Hendrickson, both of Rochester; Gary L. Mattson, Pine Island; William D. McNeil, Rochester, all of Minn.

[73] Assignee: International Business Machines Corporation, Armonk, N.Y.

[22] Filed: Mar. 17, 1972

[21] Appl. No.: 235,703

[52] U.S. Cl............. 318/627, 318/640, 250/83.3 H
[51] Int. Cl............................................. G05g 5/00
[58] Field of Search................... 318/640, 627, 637; 250/83.3 H

[56] References Cited
UNITED STATES PATENTS

| | | | |
|---|---|---|---|
| 3,171,954 | 3/1965 | Stern............................ | 318/637 X |
| 3,440,505 | 4/1969 | Nielsen............................. | 318/627 |
| 3,532,957 | 10/1970 | Mettert............................ | 318/627 |
| 3,541,419 | 11/1970 | Jasons.............................. | 318/627 |
| 3,665,282 | 5/1972 | Skehan............................ | 318/627 |

Primary Examiner—T. E. Lynch
Attorney, Agent, or Firm—Donald F. Voss

[57] ABSTRACT

A control system for a motor which angularly positions a mirror at a predetermined rate. The initial angular position for the mirror is applied in digital form to a digital analog converter (DAC). The rate of angular rotation is coded in digital form and the digital signals representing a particular rate are applied to a rate of change DAC. The output of the rate of change DAC is connected to an integrator which provides a voltage changing at a constant rate with time. A control signal starts the integrator and resets the integrator after the mirror has been rotated at the predetermined angular rate for a predetermined period of time. The output of the integrator is combined with the output of the position DAC so as to provide a reference position signal which is summed with a negative feedback signal obtained by sensing the position of the mirror. This results in a voltage difference signal which is amplified and applied to a high torque low inertia DC motor.

8 Claims, 5 Drawing Figures

SECTOR SCANNING CONTROL SYSTEM

BACKGROUND OF THE INVENTION

1. Field of the Invention

This invention relates to control systems and particularly to control systems for angularly positioning an element and more particularly, to control systems for angularly positioning an element at a predetermined angular rate.

2 Description of the Prior Art

It is well-known in the art to drive a motor for positioning an element such as a mirror or recording pen under control of an error signal derived by sensing the position of the element. Such a system is found in U.S. Pat. No. 3,466,516. However, this control system does not have any means for controlling the rate of angular rotation. Other prior art systems such as in U.S. Pat. No. 3,414,731 do not directly sense the position of the element as it is being positioned and do not include means for controlling the rate of angular rotation.

Without the feature of controlling the rate of angular rotation, the prior art control systems are unable to compensate for skew. Hence, this invention is particularly advantageous because the element being angularly positioned is moving smoothly at a predetermined rate. Further, in view of the digital inputs for both position and rate of angular rotation, it is a simple matter to change the control parameters. The changes, of course, can be facilitated through the use of a computer or other suitable programmed digital control system.

SUMMARY OF THE INVENTION

The principal objects of the invention are to provide improved control apparatus for angularly positioning an element which: (a) operates at relatively high speed; (b) can hold the position of the element accurately; (c) smoothly moves the element as it is being positioned; and (d) controls the rate of angular rotation.

The foregoing objects are achieved by a control system which includes an angle sensor for sensing the actual position of the element being positioned. The analog signal representing the actual position of the element is compared with an analog reference signal. The analog reference signal is formed by combining a signal representing the initial angular position with a signal representing the rate of angular rotation. The initial angular position signal is obtained by converting a digital input indicating the initial angular position to an analog signal. The rate of angular rotation is developed by first converting the desired rate, which is indicated in digital form, to an analog signal. This rate analog signal is then integrated for a predetermined period of time to provide a signal which is changing at a constant rate with time. This signal is then combined with the analog signal representing the initial angular position. The signal resulting from this combination is summed with the negative feedback signal from the angle sensor to form a drive signal.

The invention finds particular utility in scanner systems for optical character recognition machines. The mirror which is angularly rotated is part of the optics for the scanner and causes the image of the photosensitive diode array in the scanner to follow along a line of printing even though the line of printing may be skewed. The starting position of the line to be scanned is represented in digital form and comes from the format control section of the optical character recognition machine which in turn may receive this information from a computer. The line skew information is also in digital form and is derived during a prerecognition scan. The invention thus enables selective scanning of lines under complete digital control.

DESCRIPTION

Figure 1:
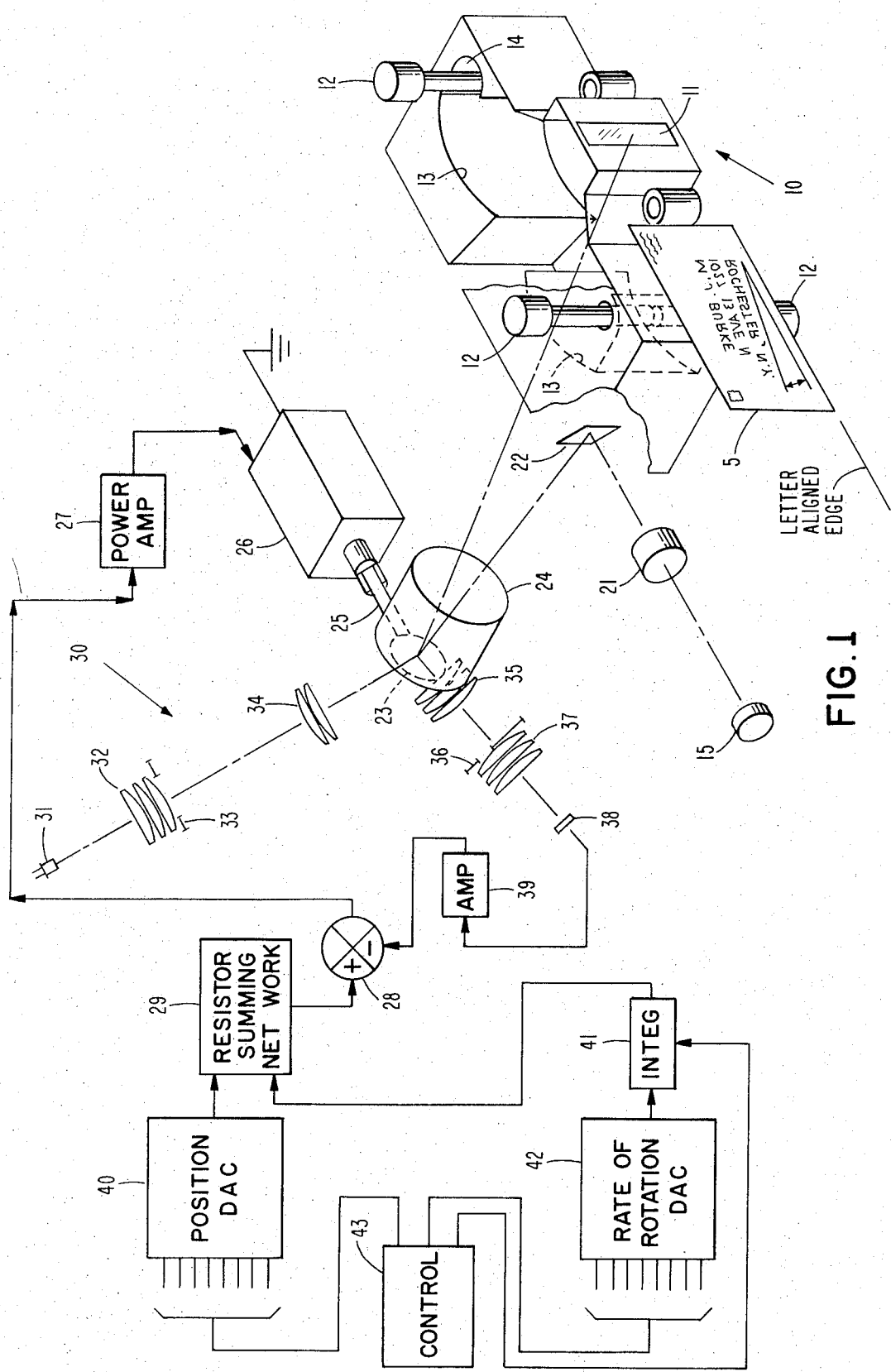
FIG. 1 is a schematic diagram illustrating the invention as embodied in an optical scanning system.

With reference to the drawings and particularly to FIG. 1, the invention is illustrated by way of example as being incorporated in the scanning system of an optical character recognition machine. The scanning system is adapted to scan lines of printing forming the address upon a piece of mail 5 which is suitably transported pass a light transmissive window 11 at the reading station 10. Light from four single ended lamps 12 is focused by two elliptic cylindrical mirrors 13 onto the common focal line of the ellipses to illuminate the address area of the mail piece via the light transmissive window 11. Cylindrical mirrors 14 increase the efficiency of illumination. The image of photosensitive diode array 15 is servoed in the vertical direction to scan a predetermined line in the address field as the piece of mail 5 moves past the window 11. Actually, there are four photosensitive diode arrays in the scanner, one for each possible address line. In order to simplify the illustration of the invention, only one photosensitive diode array is shown. Similarly, only one mirror 23 for positioning the diode array is shown. The imaging system includes lens 21, folding mirror 22, rotating mirror 23, and lens 24.

Mirror 23 is attached to shaft 25 of high torque, low inertia DC motor 26. Motor 26 is driven by an error voltage signal amplified by power amplifier 27.

The error voltage signal is developed by summer 28 which sums the positive analog signal from the resistor summing network 29 with a negative feedback analog signal generated by an angle sensor 30 and applied to summer 28 via amplifier 39.

Resistor summing network 29 combines the analog signal from position digital to analog converter (DAC) 40 with the analog signal from integrator 41. Integrator 41 is selectively operable under control of a timing signal from control 43. Integrator 41 functions to integrate the analog signal from rate of rotation digital to analog converter 42. The DAC's 40 and 42 are loaded with eight bit binary words from control 43. Position DAC 40 is loaded with a binary word so as to initially cause motor 26 to position mirror 23 in a zero or home position. Calibration apparatus which does not form a part of the invention and is not shown ensures the positioning accuracies of the control system.

Figure 2:
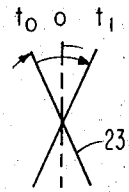
FIG. 2 is a diagram illustrating three angular positions of the mirror.

After mirror 23 has settled in the zero position, FIG. 2, control 43 loads position DAC 40 with a binary word to cause motor 26 to position mirror 23 to an initial position $t_o$. During this time, integrator 41 is not operative. The signal from angle sensor 30, however, is being applied to summer 28 via amplifier 39. Angle sensor 30 operates off the back mirrored surface of mirror 23.

Figure 5:
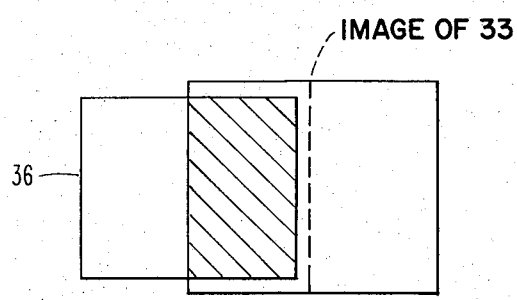
FIG. 5 is a diagram illustrating aperture and image overlap in the mirror angle sensor.

The angle sensor 30 operates by measuring the overlapped area between aperture 36 and aperture 33 which is imaged onto aperture 36. Aperture 33 is uniformly illuminated by light from light emitting diode 31 and condenser lens 32. Lens 34 forms an image of aperture 33 at infinity and an image of light emitting diode 31 on the back surface of mirror 23. Lens 35 forms an image of the light emitting diode 31 at infinity and a demagnefied image of aperture 33 at aperture 36. The image of aperture 33 falls on aperture 36 as shown in FIG. 5 when mirror 33 is undeflected, i.e., zero degrees. As mirror 23 is moved angularly, the image of aperture 33 moves. The amount of light passing through aperture 36 is proportional to the overlapped area between apertures 33 and 36. The light passing through the overlapped area is focused onto solar cell 38 by lens 37. The image of light emitting diode 31 on solar cell 38 moves very little as mirror 23 is angularly rotated. This minimizes non-linearities due to sensitivity variation over the space of solar cell 38. It should be recognized that other angle sensors could be used including analog or digital angle sensors. If a digital angle sensor were used, its output would be converted to an analog signal.

Figure 3:
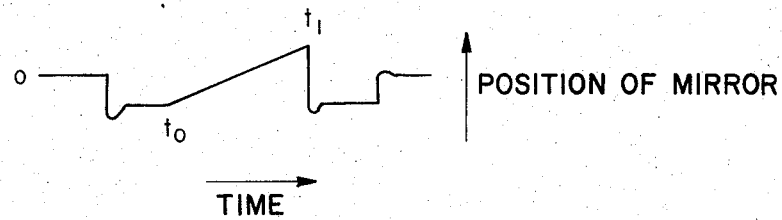
FIG. 3 is a diagram illustrating angular rotation of the mirror versus time.
Figure 4:
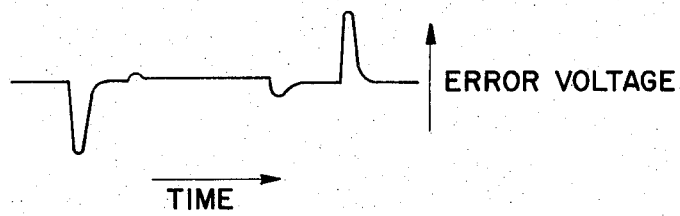
FIG. 4 is a diagram illustrating the error voltage wave form.

The position of an address line to be read has been ascertained at a pre-scan station not shown. Also, as the document moves along the transport path, its instantaneous position relative to the read station is known. This information resides in control 43 and is used to develop the signal for controlling integrator 41. The binary word in the rate of rotation DAC 42 is converted to an analog signal which is integrated by 41 to form a linear ramp voltage having a slope proportional to the rate of angular rotation. In order to track a line accurately, integrator 41 is started early from an offset position to allow the tracking motion to become linear. The linear ramp voltage is shown in FIG. 3 and is the voltage from time $t_o$ to $t_1$. The outputs of position DAC 40 and integrator 41 are summed by resistor summing network 29. The output of resistor summing network 29 is applied to the positive input terminal of summer 28. The negative feedback signal from angle sensor 30 is applied to the negative input terminal of summer 28 via amplifier 39. The output voltage signal from summer 28 is an error voltage for driving motor 26 and is represented in FIG. 4. Resistor summing network 29, summer 28 and integrator 41 are circuitry well-known in the prior art. DAC 40 and 42 are preferably of the type shown and described in commonly assigned U.S. Pat. No. 3,544,994 dated Dec. 1, 1970 for Digital To Analog Converter.

From the foregoing, it is seen that the invention provides a control system for motor 26 so that it smoothly rotates mirror 23 at a rate whereby the image of photosensitive diode array 15 follows along a line of printing which may be skewed on letter 5. Power amplifier 27 provides a high power drive to motor 26 to achieve a fast response and settling time. Hence, motor 26 is able to operate at relatively high speed.

What is claimed is:

1. A system for controlling a motor for angularly positioning an element comprising means for continuously sensing the angular position of the element being positioned and generating a feedback signal having a magnitude proportional to an instantaneous angular position, position signal generating means for generating an initial angular position signal, selectively operable means for generating a rate of angular rotation signal changing at a constant rate with time, combining means for combining said initial angular position signal and said rate of angular rotation signal in one sense with said feedback signal in an opposite sense to develop a resulting signal for controlling said motor, and control means for controlling said position signal generating means and said selectively operable means to first provide said initial angular position signal to said combining means to first develop a resulting signal with said feedback signal for operating said motor whereby said element is positioned to an initial position and then to provide said rate of angular rotation signal changing at a constant rate with time to said combining means to develop a resultant signal with said initial angular position signal and said feedback signal for operating said motor whereby said element is moved away from said initial position at a predetermined rate of angular rotation changing at a constant rate with time.

2. The system of claim 1 wherein said means generating an initial angular position comprises a digital to analog converter for converting a digital representation of an initial position to analog signal.

3. The system of claim 1 wherein said means for generating a rate of angular rotation signal comprises a digital to analog converter for converting a digital representation of a rate of angular rotation to an analog signal and integrating means for integrating said analog signal representing rate of angular rotation for a predetermined period of time to provide a signal changing at a constant rate over said predetermined period of time.

4. The system of claim 1 wherein said element being angularly positioned is a mirror and said means for continuously sensing the angular position of said element senses the back side of said mirror.

5. A system for controlling a motor for angularly positioning an element comprising a pair of digital to analog converters, one of said digital to analog coverters being loaded with digital signals representing an initial angular position, the other digital to analog converter being loaded with digital signals representing a rate of angular rotation:

selectively operable integrating means connected to integrate the output of said other digital to analog converter to provide upon being rendered operable a voltage signal changing at a constant rate with time;

summing means for summing the outputs of said one digital to analog converter and said integrating means;

angle sensing means for sensing the angular position of the element being positioned and generating a voltage varying with the position of said element;

means for comparing the signal of said summing means with the signal from said angle sensing means to develop and voltage difference signal for controlling said motor, and control means for providing a control signal to said selectively operable integrating means to render the same operable after said motor has positioned said element to said initial angular position.

6. The control system of claim 5 wherein said summing means is a resistor summing network.

7. The control system of claim 5 wherein said comparing means is an analog summer.

8. A system for controlling a motor for angularly moving an element from an initial position at a controlled angular rate comprising a power amplifier connected to drive said motor, position signal generating means responsive to digital inputs to generate an analog signal having a magnitude proportional to a predetermined angular position of said element, sensing means for continuously sensing the angular position of said element and generating a feedback signal having a magnitude proportional to an instantaneous angular position, rate of rotation signal generating means responsive to digital inputs for generating a signal having a magnitude proportional to a predetermined angular rate of rotation, selectively operable integrating means connected to integrate said signal generated by said rate of rotation signal generating means in response to a control signal rendering said integrating means operable, signal combining means for combining in one sense the signal from said position generating means with said signal from said integrating means and combining in an opposite sense the signal from said sensing means to provide a resultant signal to said power amplifier for driving said motor, and control means for first providing digital inputs to said position signal generating means and said rate of rotation signal generating means and then providing a signal for starting said integrating means whereby said motor first rotates said element to an initial position determined by the signal from said position signal generating means and then rotates said element away from said initial position at an angular rate determined by the signal from said integrating means.

* * * * *